(12) United States Patent
Nielsen et al.

(10) Patent No.: US 10,723,090 B2
(45) Date of Patent: Jul. 28, 2020

(54) METHOD OF MANUFACTURING A COMPOSITE LAMINATE STRUCTURE

(71) Applicant: LM WP PATENT HOLDING A/S, Kolding (DK)

(72) Inventors: Lars Nielsen, Skanderborg (DK); Klavs Jespersen, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 99 days.

(21) Appl. No.: 16/078,712

(22) PCT Filed: Feb. 21, 2017

(86) PCT No.: PCT/EP2017/053905
§ 371 (c)(1),
(2) Date: Aug. 22, 2018

(87) PCT Pub. No.: WO2017/144449
PCT Pub. Date: Aug. 31, 2017

(65) Prior Publication Data
US 2019/0039337 A1 Feb. 7, 2019

(30) Foreign Application Priority Data

Feb. 23, 2016 (EP) .................................. 16156993

(51) Int. Cl.
*B29C 70/54* (2006.01)
*B29C 70/48* (2006.01)
(Continued)

(52) U.S. Cl.
CPC .......... *B29C 70/547* (2013.01); *B29C 70/443* (2013.01); *B29C 70/48* (2013.01);
(Continued)

(58) Field of Classification Search
CPC ....... F03D 80/30; B29C 70/547; B29C 70/88; B29C 70/882; B29C 70/887; F05B 2280/2006
See application file for complete search history.

(56) References Cited

U.S. PATENT DOCUMENTS 7,758,313 B2 * 7/2010 Eyb .......................... F03D 1/065
416/226
9,181,923 B2 * 11/2015 Grabau ................... B29C 33/12
(Continued)

FOREIGN PATENT DOCUMENTS

GB 2381493 A 5/2003

OTHER PUBLICATIONS

Eddy Current, "Conductivity of Metals Sorted by Resistivity" accessed from http://eddy-current.com/conductivity-of-metals-sorted-by-resistivity/ on Jan. 18, 2020 (Year: 2020).*
(Continued)

*Primary Examiner* — Michael Lebentritt
*Assistant Examiner* — Topaz L. Elliott
(74) *Attorney, Agent, or Firm* — Nath, Goldberg & Meyer; Jerald L. Meyer; Tanya E. Harkins

(57) ABSTRACT

The present disclosure provides a method of manufacturing a composite laminate structure of a wind turbine blade part by means of resin transfer moulding, preferably vacuum-assisted resin transfer moulding. In a resin transfer moulding, fibre-reinforcement material is impregnated with liquid resin in a mould cavity. The mould cavity comprises rigid mould part having a mould surface defining a surface of the wind turbine blade part.
The method comprises alternately stacking on the rigid mould part:
i. a number of unidirectional fibre-reinforcement layers comprising electrically conductive fibres, such as carbon fibres, and
(Continued)

ii. a flow-enhancing fabric layer for enhancing a flow of the resin during infusion of the fibre-reinforcement layers, the flow-enhancing fabric layer comprising an open-structured layer made of a first material, wherein the flow-enhancing fabric layer comprises a longitudinal direction and a transverse direction, The flow-enhancing fabric layer further comprises filaments or bundles of fibres made of a second material, which is an electrically conductive material and which are arranged and configured to provide a conductive path from first electrically conductive fibres of a first fibre-reinforcement layer on a first side of the flow-enhancing layer to second electrically conductive fibres of a second fibre-reinforcement layer on a second side of the flow-enhancing layer.

16 Claims, 7 Drawing Sheets

(51) Int. Cl.
| | |
|---|---|
| *B29C 70/88* | (2006.01) |
| *B29C 70/44* | (2006.01) |
| *F03D 80/30* | (2016.01) |
| *B32B 3/26* | (2006.01) |
| *B32B 5/02* | (2006.01) |
| *B32B 5/08* | (2006.01) |
| *B32B 5/12* | (2006.01) |
| *B32B 27/08* | (2006.01) |
| *B23B 27/12* | (2006.01) |
| *F03D 1/06* | (2006.01) |
| *B29L 31/08* | (2006.01) |
| *B29K 307/04* | (2006.01) |
| *B32B 27/12* | (2006.01) |
| *B29K 309/08* | (2006.01) |

(52) U.S. Cl.
CPC ............ *B29C 70/882* (2013.01); *B32B 3/266* (2013.01); *B32B 5/028* (2013.01); *B32B 5/08* (2013.01); *B32B 5/12* (2013.01); *B32B 27/08* (2013.01); *B32B 27/12* (2013.01); *F03D 1/0675* (2013.01); *F03D 80/30* (2016.05); *B29K 2307/04* (2013.01); *B29K 2309/08* (2013.01); *B29K 2995/0005* (2013.01); *B29L 2031/085* (2013.01); *B32B 2260/021* (2013.01); *B32B 2260/046* (2013.01); *B32B 2262/101* (2013.01); *B32B 2262/106* (2013.01); *B32B 2307/202* (2013.01); *B32B 2603/00* (2013.01); *F05B 2230/31* (2013.01); *F05B 2280/2006* (2013.01); *Y02P 70/523* (2015.11)

(56) References Cited

U.S. PATENT DOCUMENTS

| | | | | |
|---|---|---|---|---|
| 9,631,501 | B2* | 4/2017 | Dahl | B29C 70/547 |
| 9,816,482 | B2* | 11/2017 | Caruso | F03D 1/0675 |
| 10,066,599 | B2* | 9/2018 | Ohlerich | B29D 99/0028 |
| 10,343,372 | B2* | 7/2019 | Hallander | B32B 5/12 |
| 10,428,790 | B2* | 10/2019 | Smith | B29C 70/44 |
| 2008/0277053 | A1* | 11/2008 | Stiesdal | B29C 70/342 |
| | | | | 156/245 |
| 2011/0164987 | A1* | 7/2011 | Grabau | B29C 33/12 |
| | | | | 416/230 |
| 2012/0009069 | A1* | 1/2012 | Grove-Nielsen | F03D 1/0683 |
| | | | | 416/226 |
| 2013/0049249 | A1* | 2/2013 | Frankowski | B29C 70/443 |
| | | | | 264/102 |
| 2014/0119936 | A1* | 5/2014 | Dahl | B32B 27/08 |
| | | | | 416/230 |
| 2014/0271217 | A1* | 9/2014 | Baker | F03D 1/0633 |
| | | | | 416/226 |
| 2015/0292479 | A1* | 10/2015 | Ohlerich | B29C 43/56 |
| | | | | 416/226 |
| 2015/0368861 | A1* | 12/2015 | Dahl | D07B 7/14 |
| | | | | 428/338 |
| 2016/0138569 | A1* | 5/2016 | Caruso | F03D 1/0675 |
| | | | | 416/241 R |
| 2016/0221272 | A1* | 8/2016 | Koefoed | F03D 80/30 |
| 2016/0288429 | A1* | 10/2016 | Bergstrom | D05B 3/00 |
| 2017/0129207 | A1* | 5/2017 | Hallander | B29C 70/08 |
| 2017/0218918 | A1* | 8/2017 | Cieslak | B32B 5/024 |
| 2018/0245566 | A1* | 8/2018 | Sawada | F03D 80/30 |
| 2018/0311912 | A1* | 11/2018 | Restuccia | B29C 70/025 |
| 2018/0346146 | A1* | 12/2018 | Sang | B64C 1/12 |
| 2019/0160766 | A1* | 5/2019 | Fastert | B29C 70/885 |

OTHER PUBLICATIONS

Extended European search report dated Aug. 11, 2016 for corresponding application No. 16156993.4.

International search report dated May 30, 2017 for corresponding application No. PCT/EP2017/053905.

* cited by examiner

METHOD OF MANUFACTURING A COMPOSITE LAMINATE STRUCTURE

This is a National Phase Application filed under 35 U.S.C. 371 as a national stage of PCT/EP2017/053905, filed Feb. 21, 2017, an application claiming the benefit of European Application No. 16156993.4, filed Feb. 23, 2016, the content of each of which is hereby incorporated by reference in its entirety.

FIELD OF THE INVENTION

The present disclosure pertains to the field of manufacturing composite laminate structures, and more specifically to manufacturing parts of wind turbine blades. The present disclosure relates to a method of manufacturing a composite laminate structure of a wind turbine blade part and a part of the wind turbine blade, as well as a resin flow enhancing fabric.

BACKGROUND OF THE INVENTION

A wind turbine blade usually comprises a composite laminate structure as load carrying structure. The composite laminate structure is typically manufactured using fibre reinforcing material embedded in a polymer matrix. The laminate structure is typically formed by a plurality of stacked fibre layers. Today, the fibre layers are mostly selected from glass fibres and carbon fibres.

The load carrying structure is typically manufactured by infusing stacked fibre layers with resin and curing or hardening the resin in order to form a composite structure. To aid the resin flow during infusion, a flow enhancing fabric may be needed between fibre layers. This is particularly the case for carbon fibres due to the small size of the fibres and hence the insufficient size of voids between the fibres to let resin flow. However, placing a conventional flow media isolates or separates each fibre layers from one another. The conventional flow media isolating the fibre layers results in significantly reducing the conductivity in between each carbon fibre layers. Thus when a lightning strikes the load carrying structure, despite the presence of a lightning protection system, the lighting current cannot be easily dissipated in the load carrying structure.

Thus, there is a need for a solution that provides both flow for the resin to be infused and conductivity through stacked fibre layers.

SUMMARY OF THE INVENTION

It is an object of the present disclosure to provide a method of manufacturing a composite laminate structure of a wind turbine blade part and a part of a wind turbine blade which overcome or ameliorate at least one of the disadvantages of the prior art or which provide a useful alternative.

The present disclosure relates to a method of manufacturing a composite laminate structure of a wind turbine blade part by means of resin transfer moulding, preferably vacuum-assisted resin transfer moulding. In a resin transfer moulding, fibre-reinforcement material is impregnated with liquid resin in a mould cavity. The mould cavity comprises rigid mould part having a mould surface defining a surface of the wind turbine blade part.

The method comprises alternately stacking on the rigid mould part:
i. a number of fibre-reinforcement layers comprising electrically conductive fibres, such as carbon fibres, and
ii. a flow-enhancing fabric layer for enhancing a flow of the resin during infusion of the fibre-reinforcement layers, the flow-enhancing fabric layer comprising an open-structured layer made of a first material, wherein the flow-enhancing fabric layer comprises a longitudinal direction and a transverse direction, The fibre-reinforcement layer may comprise unidirectional fibres. The method comprises sealing a second mould part against the rigid mould part in order to form the mould cavity. The method comprises optionally evacuating the mould cavity. The method comprises supplying a resin to the mould cavity and curing or hardening the resin in order to form the composite laminate structure. The flow-enhancing fabric layer further comprises filaments or bundles of fibres made of a second material, which is an electrically conductive material and which are arranged and configured to provide a conductive path from first electrically conductive fibres of a first fibre-reinforcement layer on a first side of the flow-enhancing layer to second electrically conductive fibres of a second fibre-reinforcement layer on a second side of the flow-enhancing layer. The filaments or bundles may be disposed in an angle defined with respect to the transverse direction. The combination of unidirectional fibre-reinforcement layers and flow-enhancing fabrics with electrically conductive filaments or bundles of fibres disposed at an angle relative to the unidirectional fibres is particularly advantageous, since the angled filaments or bundles of fibres may contact many of the electrically conductive fibre-reinforcement layers of the fibre-reinforcement layers and thus provide a conductive path and potential equalisation of the electrically conductive reinforcement fibres.

Thus, the present disclosure provides a method to manufacture an improved composite structure that allows both to promote resin flow via the flow-enhancing fabric layer during infusion and to maintain conductivity through the thickness of the composite structure under lightning strikes by providing, in the flow-enhancing fabric layer, filaments or bundles of fibres made of an electrically conductive material. Infusion time may be decreased significantly and a proper wetting of the fibre layers may be achieved by utilising the flow-enhancing fabric layers. The present disclosure also advantageously provides the ability to manufacture composite structures that have a thicker carbon fibre laminate or hybrid material layers comprising carbon fibres and still provide a minimized risk of failure or delamination caused by lightning strikes.

The present disclosure relates to a wind turbine blade part comprising a composite laminate structure, wherein the composite laminate structure comprises alternately stacked layers of:
i. a number of fibre-reinforcement layers comprising electrically conductive fibres, such as carbon fibres, and
ii. a flow-enhancing fabric layer for enhancing a flow of the resin during infusion of the fibre-reinforcement layers.

The fibre-reinforcement layer may comprise unidirectional fibres. The flow-enhancing fabric layer comprises an open-structured layer made of a first material, wherein the flow-enhancing fabric layer comprises a longitudinal direction and a transverse direction. The alternately stacked layers are embedded in a polymer matrix material. The flow-enhancing fabric layer further comprises filaments or bundles of fibres made of a second material, which is an electrically conductive material. The filaments or bundles are arranged and configured to provide a conductive path from first electrically conductive fibres of a first fibre-reinforcement layer on a first side of the flow-enhancing layer to second electrically conductive fibres of a second fibre-reinforcement layer on a second side of the flow-enhancing layer. The filaments or bundles may be disposed in an angle defined with respect to the unidirectionally oriented fibres of the fibre-reinforcement layers.

The present disclosure also relates to a wind turbine blade comprising the wind turbine part disclosed herein.

It is clear that the aforementioned aspects of the invention may be combined in any way and are linked by the common aspect of enhancing flow and maintaining conductivity through the composite laminate structure.

It is noted that advantages enunciated with respect to the method of manufacturing a composite laminate structure of a wind turbine blade part apply to the wind turbine blade part and the wind turbine blade.

BRIEF DESCRIPTION OF THE FIGURES

Embodiments of the invention will be described in more detail in the following with regard to the accompanying figures. The figures show one way of implementing the present invention and are not to be construed as being limiting to other possible embodiments falling within the scope of the attached claim set.

DETAILED DESCRIPTION OF THE INVENTION

Figure 1:
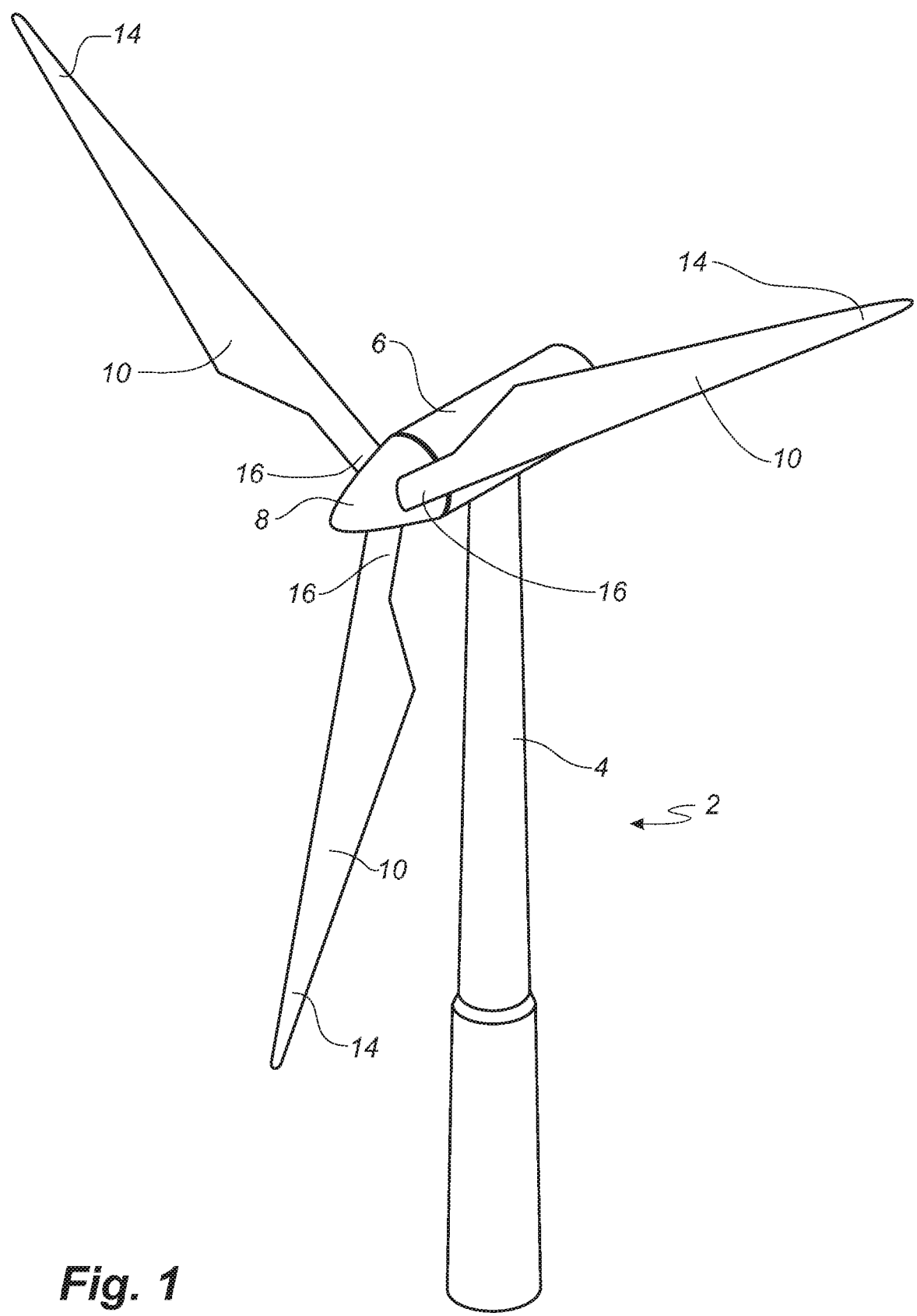
FIG. 1 shows a wind turbine.

Composite laminate structures of wind turbine blade parts can be manufactured by means of resin transfer moulding, preferably vacuum-assisted resin transfer moulding. In resin transfer moulding, the fibre-reinforcement material is impregnated with liquid resin in a mould cavity. The mould cavity is typically formed between a rigid mould part having a mould surface defining a surface of the wind turbine blade part and a flexible mould part. The resin disperses in all directions in the mould cavity as a flow front moves towards the resin-free area.

Over the years, the wind turbine blade industry has moved towards manufacture of longer and longer blade parts requiring thicker laminates. However, thick laminates makes it more difficult to obtain a proper wetting of the fibre layers, and the likelihood for air pockets to be formed in the laminate increases, which in turn may lead to mechanical weak points in the laminate. Thus, it is especially important to promote flow of resin in a thicker laminate by adding flow layers regularly in the fibre stack. However, the presence of additional flow media or flow material results in an electrical isolation between the fibre layers, and thus decreases conductivity across the thickness of the laminate. Decreasing conductivity may lead to a reduction of dissipation of the current through the laminate thickness, which would result in a failure and delamination of the laminate when e.g. the composite structure is hit by a lightning current. To prevent such damages under high current while maintaining an optimal resin distribution, the present disclosure proposes to add an inventive flow-enhancing fabric layer between the fibre layers that solves the problem of resin distribution during infusion and maintains conductivity across the thickness of the laminate.

As discussed herein, promoting flow is usually at the cost of conductivity, and a trade-off between flow and conductivity is difficult to strike especially for thick laminate. The present disclosure achieves this balance by alternately arranging or stacking fibre-reinforcing layers that are conductive and a flow-enhancing fabric layer that is shaped or has an open structure to promote flow of resin through the fibre layers. The flow-enhancing fabric layer also comprises filaments or bundles of a conductive material, which create a conductive path for a current to be dissipated when running from a first fibre-reinforcing layer to a second fibre-reinforcing layer via the conductive flow-enhancing fabric layer, and this through the thickness of the composite laminate structure.

As used herein, the term "flow-enhancing fabric layer" relates to a layer that has a higher permeability with respect to the resin compared to the fibre-reinforcement layer, e.g. for a comparable thickness, and which thus promotes or enhances the flow of resin through the thickness of the stacked fibre layers and/or along the length and width of the stacked fibre layers.

The present disclosure relates to a method of manufacturing a composite laminate structure of a wind turbine blade part by means of resin transfer moulding, preferably vacuum-assisted resin transfer moulding. In a resin transfer moulding, fibre-reinforcement material is impregnated with liquid resin in a mould cavity. The mould cavity comprises rigid mould part having a mould surface defining a surface of the wind turbine blade part.

The method comprises alternately stacking on the rigid mould part:

iii. a number of fibre-reinforcement layers comprising electrically conductive fibres, such as carbon fibres, and iv. a flow-enhancing fabric layer for enhancing a flow of the resin during infusion of the fibre-reinforcement layers.

The fibre-reinforcement layers comprise unidirectionally oriented fibres. The flow-enhancing fabric layer comprises an open-structured layer made of a first material. According to some aspects of this disclosure, the open-structured layer of the flow-enhancing fabric layer is a meshed or woven layer. Additionally, or alternatively, the open-structured layer may be a perforated layer. The flow-enhancing fabric layer comprises a longitudinal direction and a transverse direction. For example, the flow enhancing fabric layer is in form of a bi-axial mesh.

The method comprises sealing a second mould part against the rigid mould part in order to form the mould cavity. The method comprises optionally evacuating the mould cavity. The method comprises supplying a resin to the mould cavity and curing or hardening the resin in order to form the composite laminate structure.

The disclosed flow-enhancing fabric layer further comprises filaments or bundles of fibres made of a second material, which is an electrically conductive material and which are arranged and configured to provide a conductive path from first electrically conductive fibres of a first fibre-reinforcement layer on a first side of the flow-enhancing layer to second electrically conductive fibres of a second fibre-reinforcement layer on a second side of the flow-enhancing layer. For example, a stack is formed by stacking successively a first fibre-reinforcement layer, a flow-enhancing fabric layer having a first and a second side, and a second fibre-reinforcement layer. The electrically conductive material of the filaments or bundles comprised in the flow-enhancing fabric layer is in contact with electrically conductive fibres of the first fibre-reinforcement layer on the first side of the flow-enhancing fabric layer, and with electrically conductive fibres of a second fibre-reinforcement layer on the second side. This creates a conductive path between the first fibre-reinforcement layer and the second fibre-reinforcement layer via the flow-enhancing fabric layer (e.g. from the first side to the second side), so that, when a high current strikes the laminate structure, the high current can follow the conductive path and thus be dissipated in the thickness of the laminate structure. This way, the risk of failure or delamination of laminate structure under such conditions is minimized.

According to some aspects of this disclosure, the first material may be the same or very similar to the second material. According to a preferred aspect of this disclosure, the first material is different from the second material.

In one or more embodiments, the second material comprises metal or carbon. The metal comprises preferably copper. The metal may also be selected from metals such as iron, silver, gold, zinc, nickel, platinum. The flow-enhancing fabric layer further comprises metal filaments or metal fibre bundles able to conduct current. The carbon may be carbon graphite. In one or more embodiments, the second material is selected from a material having a resistivity property between $1,5 \times 10^{-8}$ to $5 \times 10^{-6}$ Ohm·meter, such as at room temperature e.g. 15-25 degrees Celsius. For example, silver exhibits a resistivity property of $1,59 \times 10^{-6}$ Ohm·meter at room temperature.

According to some aspects of this disclosure, the first material comprises electrically non-conductive material, or a material electrically less conductive than the second material or the material of the fibre-reinforcement fibres. The first material may for instance be a dielectric. In one or more embodiment, the first material is selected from a group comprising glass and a polymer material.

According to some aspects of this disclosure, the flow enhancing fabric layer is secured to a fibre-reinforcement layer such that steps a.i. and a.ii. may be carried out simultaneously. For example, the flow enhancing fabric layer may be stitched to the fibre-reinforcement layer.

According to some aspects of this disclosure, filaments or bundles of fibres are woven into the open-structured layer so as to form the flow-enhancing fabric layer. For example, bundles of fibres may be in form of yarn. The yarn may then be woven into the open-structured layer. For example, a metal or carbon yarn may be stitched onto the open-structured layer of a glass mesh. In general the yarn needs to be accessible from both sides of the flow-enhancing fabric in order to provide the conductive path. The yarn may be additional to the open-structured mesh or it may replace one or more yarns or fibre bundles of the open-structured mesh.

In one or more embodiments, filaments or bundles are disposed in an angle defined with respect to the transverse direction. For example, the open-structured layer of a mesh defines a transverse direction and a longitudinal direction, and the filaments or bundles may be arranged in an angle with respect to the transverse direction or the longitudinal direction. For example, the filaments or bundles are disposed in an angle between 15 and 75 degrees with respect to the transverse direction (such as 35-40 degrees) or with respect to the longitudinal direction. By arranging the electrically conductive filaments or bundles in an angle, it is ensured that it will contact many of the fibre bundles or tows of the fibre layers (which are typically oriented unidirectionally oriented in the laminate and preferably oriented in the longitudinal direction of the blade).

Infusing the plurality of stacked fibre layers with a resin may be performed using vacuum infusion or VARTM (vacuum assisted resin transfer moulding), which is typically employed for manufacturing composite structures, such as wind turbine blades comprising a fibre reinforced matrix material. During the process of filling the mould, a vacuum, the vacuum in this connection being understood as an under-pressure or negative pressure, is generated via vacuum outlets in the mould cavity, whereby liquid polymer is drawn into the mould cavity via the inlet channels in order to fill the mould cavity. From the inlet channels the polymer disperses in all directions in the mould cavity due to the negative pressure as a flow front moves towards the vacuum channels. Thus, it is important to position the inlet channels and vacuum channels optimally in order to obtain a complete filling of the mould cavity.

Ensuring a complete distribution of the polymer in the entire mould cavity is, however, often difficult, and accordingly this often results in so-called dry spots, i.e. areas with fibre material not being sufficiently impregnated with resin. Thus, dry spots are areas, where the fibre material is not impregnated, and where there can be air pockets, which are difficult or impossible to remove by controlling the vacuum pressure and a possible overpressure at the inlet side. In vacuum infusion techniques employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

In most cases the resin or polymer applied is polyester, vinyl ester or epoxy, but may also be PUR or pDCPD. Epoxies have advantages with respect to various properties, such as shrinkage during curing (in turn potentially leading to less wrinkles in the laminate), electrical properties and mechanical and fatigue strengths. Polyester and vinyl esters have the advantage that they provide better bonding properties to gelcoats. Thereby, a gelcoat may be applied to the outer surface of the shell during the manufacturing of the shell by applying a gelcoat to the mould before fibre-reinforcement material is arranged in the mould. Thus, various post-moulding operations, such as painting the blade, may be avoided. Further, polyesters and vinyl esters are cheaper than epoxies. Consequently, the manufacturing process may be simplified and costs may be lowered.

Often the composite structures comprise a core material covered with a fibre reinforced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

As for instance blades for wind turbines have become bigger and bigger in the course of time and may now be more than 60 meters long, the impregnation time in connection with manufacturing such blades have increased, as more fibre material has to be impregnated with polymer. Furthermore, the infusion process has become more complicated, as the impregnation of large shell members, such as blades, requires control of the flow fronts to avoid dry spots, the control may e.g. include a time-related control of inlet channels and vacuum channels. This increases the time required for drawing in or injecting polymer. As a result, the polymer has to stay liquid for a longer time, normally also resulting in an increase in the curing time.

Alternatively, infusing the plurality of stacked fibre layers with a resin can be performed using Resin transfer moulding (RTM) which is similar to VARTM. In RTM the liquid resin is not drawn into the mould cavity due to a vacuum generated in the mould cavity. Instead the liquid resin is forced into the mould cavity via an overpressure at the inlet side.

In one or more embodiment, the composite laminate structure is a load carrying structure such as a spar, a spar cap, a main or principle laminate. The flow enhancing fabric layer is arranged to enhance flow in a desired flow direction corresponding to the longitudinal direction, the transverse direction and/or the angled direction, wherein the fibres of the fiber-reinforcement layer are aligned substantially in a longitudinal direction of composite laminate structure.

According to some aspects, the fibre-reinforcement material is a hybrid material comprising glass fibres and carbon fibres.

According to some aspects, the number of fibre-reinforcement layers of step a.i) is between 3-10. For example, a flow-enhancing fabric layer is introduced every 3-10 fibre-reinforcement layers, such as every 10-40 mm depending on the thickness of each fibre reinforcement layer.

The present disclosure relates to a wind turbine blade part comprising a composite laminate structure, wherein the composite laminate structure comprises alternately stacked layers of:
iii. a number of fibre-reinforcement layers comprising electrically conductive fibres, such as carbon fibres, and
iv. for enhancing a flow of the resin during infusion of the fibre-reinforcement layers.

Each fibre-reinforcement layer comprises unidirectionally oriented fibres. The flow-enhancing fabric layer comprising an open-structured layer made of a first material, wherein the flow-enhancing fabric layer comprises a longitudinal direction and a transverse direction. The alternately stacked layers are embedded in a polymer matrix material. The flow-enhancing fabric layer further comprises filaments or bundles of fibres made of a second material, which is an electrically conductive material. The filaments or bundles are arranged and configured to provide a conductive path from first electrically conductive fibres of a first fibre-reinforcement layer on a first side of the flow-enhancing layer to second electrically conductive fibres of a second fibre-reinforcement layer on a second side of the flow-enhancing layer.

The wind turbine blade part as disclosed herein allows a wind turbine blade to be protected against any risk of delamination caused by lightning, since energy from a lightning strike may be dispersed through the entire thickness of the laminate structure.

The present disclosure also relates to a wind turbine comprising a wind turbine blade part according to this disclosure.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
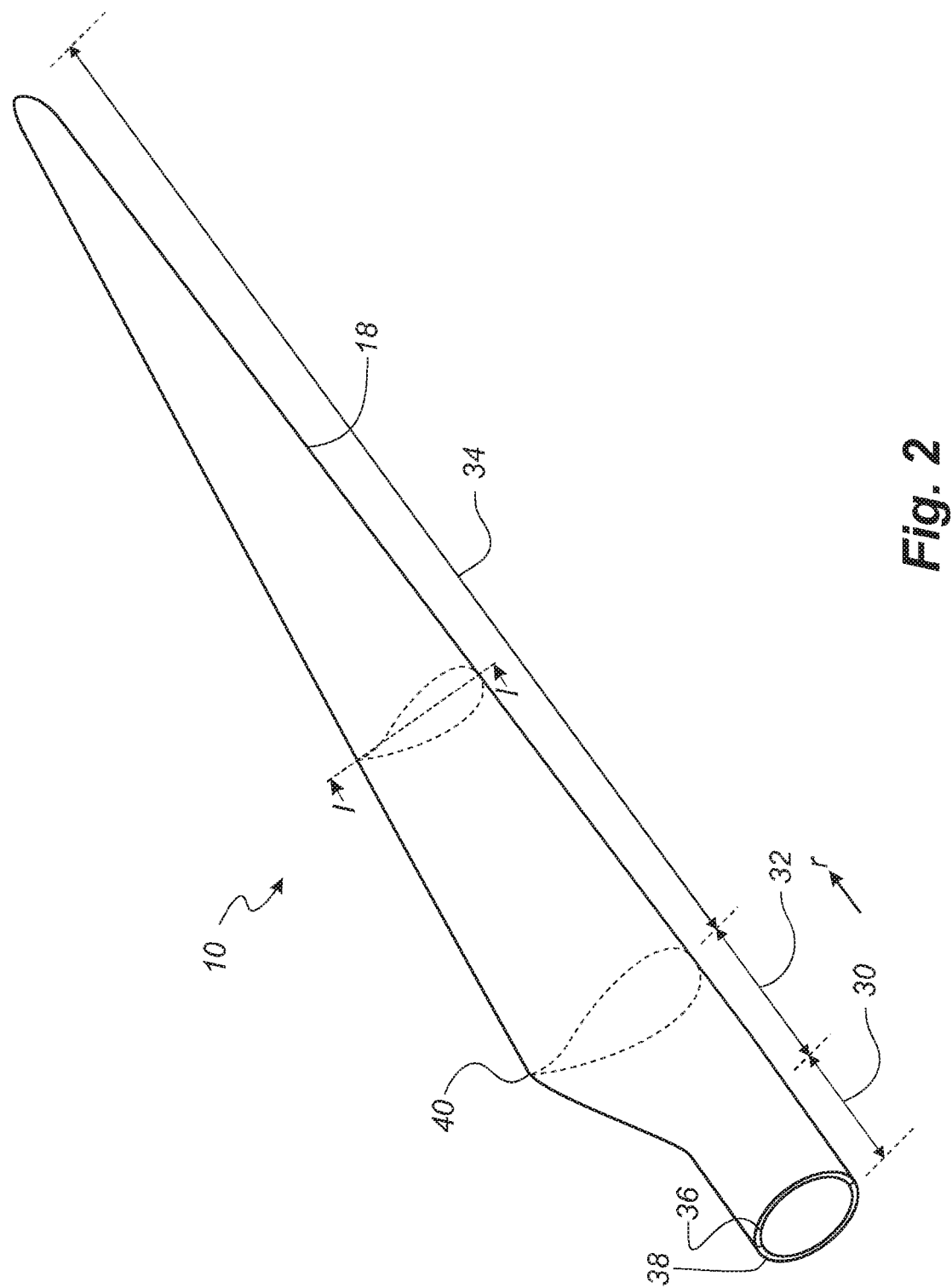
FIG. 2 shows a schematic view of a wind turbine blade according to the disclosure.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

Figure 3:
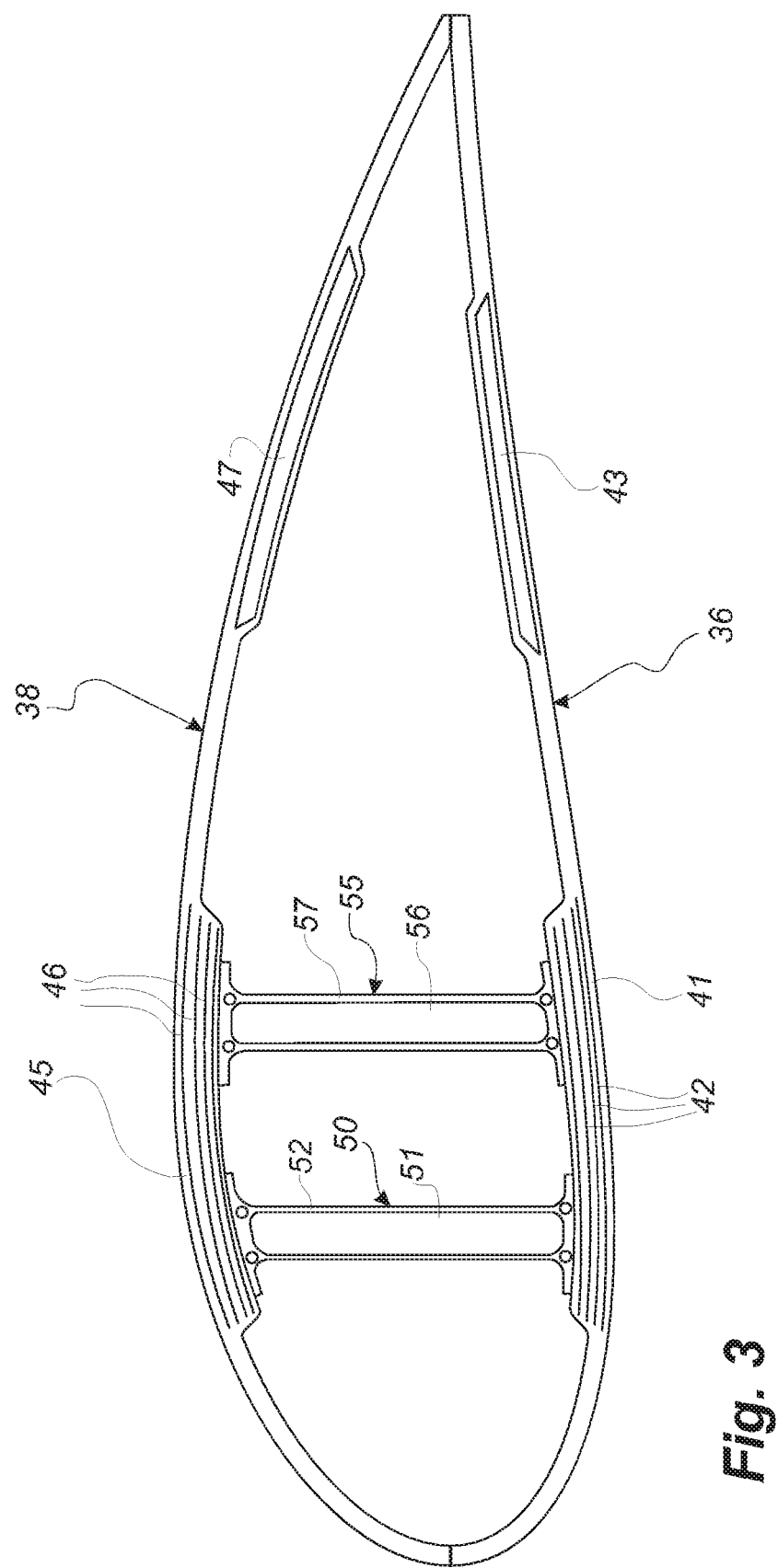
FIG. 3 shows a schematic view of a cross-section of a wind turbine blade.

FIG. 3 shows a schematic view of a cross-section of a wind turbine blade along the line I-I shown in FIG. 2. As previously mentioned, the blade 10 comprises a pressure side shell part 36 and a suction side shell part 38. The pressure side shell part 36 comprises a load carrying structure 41 such as spar cap or a main laminate, which constitutes a load bearing part of the pressure side shell part 36. The load carrying structure 41 comprises a plurality of fibre-reinforcement layers 42, such as unidirectional fibres aligned along the longitudinal direction of the blade in order to provide stiffness to the blade. The suction side shell part 38 also comprises a load carrying structure 45 comprising a plurality of fibre-reinforcement layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The load carrying structure 41 of the pressure side shell part 36 and the load carrying structure 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers, such as a number of unidirectional fibres or fibre layers. The second shear web 55 has a similar design with a shear web body and two web foot flanges, the shear web body comprising a sandwich core material 56 covered by a number of skin layers 57 made of a number of fibre layers, such as a number of unidirectional fibres or fibre layers.

The blade shells 36, 38 may comprise further fibre-reinforcement at the leading edge and the trailing edge. Typically, the shell parts 36, 38 are bonded to each other via glue flanges in which additional filler ropes may be used (not shown). Additionally, very long blades may comprise sectional parts with additional spar caps, which are connected via one or more additional shear webs.

Figure 4A:
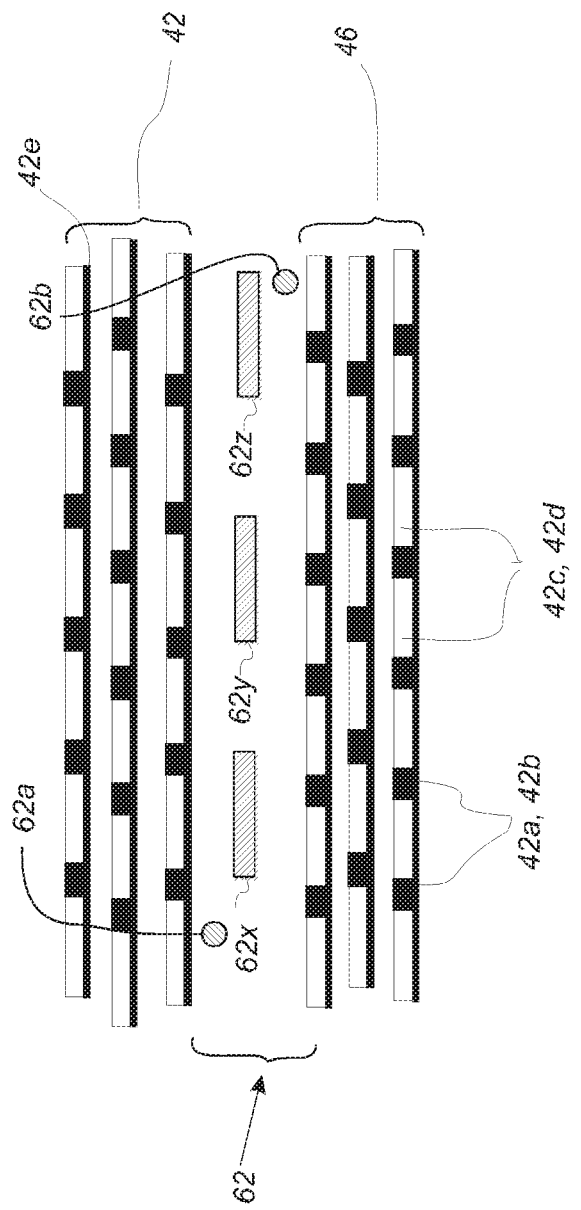
FIG. 4a shows schematically an exemplary layup or arrangement of fibre layers for an exemplary composite structure according to the disclosure.

FIG. 4a schematically shows an exploded cross-sectional view of an exemplary layup or arrangement of layers for the manufacturing of an exemplary composite structure according to the disclosure. The exemplary layup shows a stack that alternates a fibre-reinforcement layer 42, 46 with a flow-enhancing fabric layer 62. The fibre-reinforcement layer 42, 46 comprises electrically conductive fibres, such as carbon fibres. The fibre-reinforcement layer may for instance comprise a number of glass fibre rovings 42c, 42d and a number of carbon fibre tows 42a, 42b. The glass fibre rovings 42c, 42d and the carbon fibre tows 42a, 42b may be arranged on a carbon fibre substrate 42e. The fibre-reinforcement layer 42, 46 may comprise unidirectional fibres, i.e. fibres aligned unidirectionally along e.g. a longitudinal direction of the composite structure.

The flow-enhancing fabric layer 62 comprises an open-structured layer made of a first material illustrated by elements 62x, 62y, 62z. The flow-enhancing fabric layer 62 further comprises filaments or bundles of fibres 62a, 62b made of a second material, which is an electrically conductive material. The filaments or bundles of fibres 62a, 62b are arranged and configured to provide a conductive path from first electrically conductive fibres of a first fibre-reinforcement layer 42 on a first side of the flow-enhancing fabric layer 62 to second electrically conductive fibres of a second fibre-reinforcement layer 46 on a second side of the flow-enhancing layer 62. The filaments or bundles of fibres 62a, 62b may be secured on the open-structured layer made of a first material and are arranged so that they are accessible from both sides of the flow-enhancing fabric layer 62. Elements 62x, 62y, 62z. illustrate a cross-section of the open-structured layer. The open-structured layer may form a mesh on which the filaments or bundles of fibres 62a, 62b may be stitched or weaved. Their arrangement with respect to each other is to be performed such that a contact surface with the fibre-reinforcement layer is maximized to ensure conductivity. The open-structured layer is for example made of a first material that is less conductive that the second material. For example, the first material may be glass or polymer material while the second material may be metal or carbon.

Figure 4B:
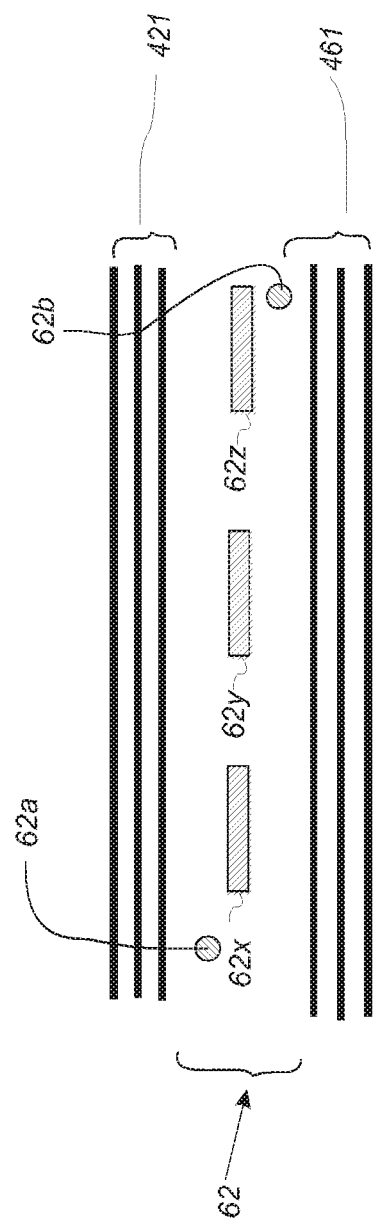
FIG. 4b shows schematically another exemplary layup or arrangement of fibre layers for an exemplary composite structure according to the disclosure.

FIG. 4b schematically shows an exploded cross-sectional view of another exemplary layup or arrangement of layers for the manufacturing of an exemplary composite structure according to the disclosure. The exemplary layup shows a stack that alternates a fibre-reinforcement layer 421, 461 with a flow enhancing fabric layer 62. The fibre-reinforcement layer 42, 46 comprises electrically conductive fibres, such as carbon fibres. The fibre-reinforcement layer may for instance be made of a pure carbon fibre layer, e.g. having carbon fibre tows. The fibre-reinforcement layer comprises unidirectional fibres, preferably oriented in the longitudinal direction of the blade.

The flow-enhancing fabric layer 62 comprises an open-structured layer made of a first material illustrated by elements 62x, 62y, 62z. The flow-enhancing fabric layer 62 further comprises filaments or bundles of fibres 62a, 62b made of a second material, which is an electrically conductive material. The filaments or bundles of fibres 62a, 62b are arranged and configured to provide a conductive path from first electrically conductive fibres of a first fibre-reinforcement layer 42 on a first side of the flow-enhancing layer 62 to second electrically conductive fibres of a second fibre-reinforcement layer 46 on a second side of the flow-enhancing fabric layer 62. The filaments or bundles may be disposed in an angle defined with respect to the transverse direction. The open-structured layer may form a mesh on which the filaments or bundles of fibres 62a, 62b may be stitched.

Although the exemplary layups of FIGS. 4a-b show a flow-enhancing fabric layer between every third fibre-reinforcement layers. It may be envisaged that a flow-enhancing fabric layer is placed between every five to ten or even more fibre-reinforcement layers. The spacing between flow-enhancing fabric layers should be arranged so as to ensure a proper wetting of the fibre-reinforcement material without causing for instance dry areas.

Figure 4C:
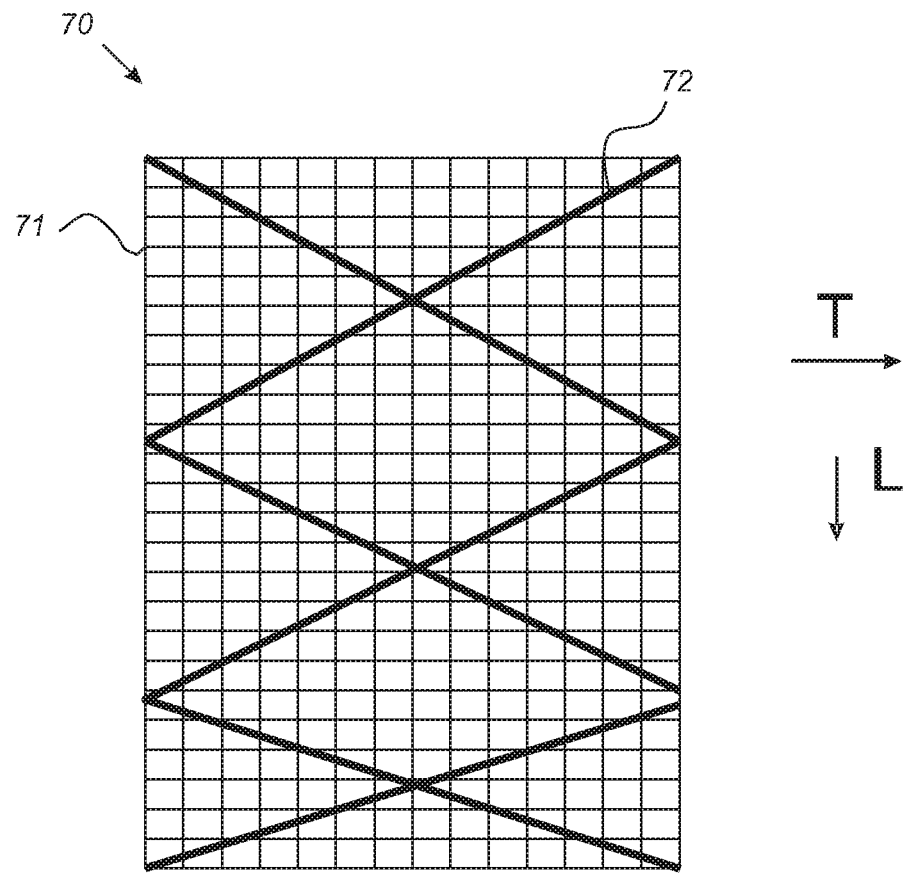
FIG. 4c shows schematically an exemplary flow-enhancing fabric layer according to the disclosure.

FIG. 4c schematically shows a top view of an exemplary flow-enhancing fabric layer 70. The flow-enhancing fabric layer 70 comprises an open-structured layer 71 made of a first material and has a longitudinal direction and a transverse direction. The first material comprises electrically non-conductive material, such as glass fibres or polymer material. The open-structured layer 71 is in form of a meshed layer, more specifically a bi-axial mesh having a longitudinal direction L and a transverse direction T. The flow-enhancing fabric layer 70 further comprises filaments or bundles 72 of fibres made of a second material, which is an electrically conductive material, such as metal or carbon. The filaments or bundles 72 are arranged and configured to provide a conductive path between the fibre-reinforcement layers. The filaments or bundles 72 are integrated, such as woven or stitched, into the open-structured layer 71. The filaments or bundles 72 are disposed in an angle defined with respect to the transverse direction T. The angle may be between 15 and 75 degrees, preferably between 35 and 40 degrees with respect to the transverse direction or the longitudinal direction. For example, the filaments or bundles 72 in form of a conductive yarn may be stitched into the open-structured layer 71 in a +/−30 degrees cross weft. The angular disposition of the filaments or bundles ensures that they contact a large number of the conductive fibres of the fibre layers and thus improves the conduction of a current possibly entering the composite laminate structure.

When the composite laminate structure is a load-carrying structure of the wind turbine blade, the fibres of the fibre-reinforcement layers may be aligned along a longitudinal direction of the laminate which can be parallel to the longitudinal direction L or the transverse direction T.

Figure 5:
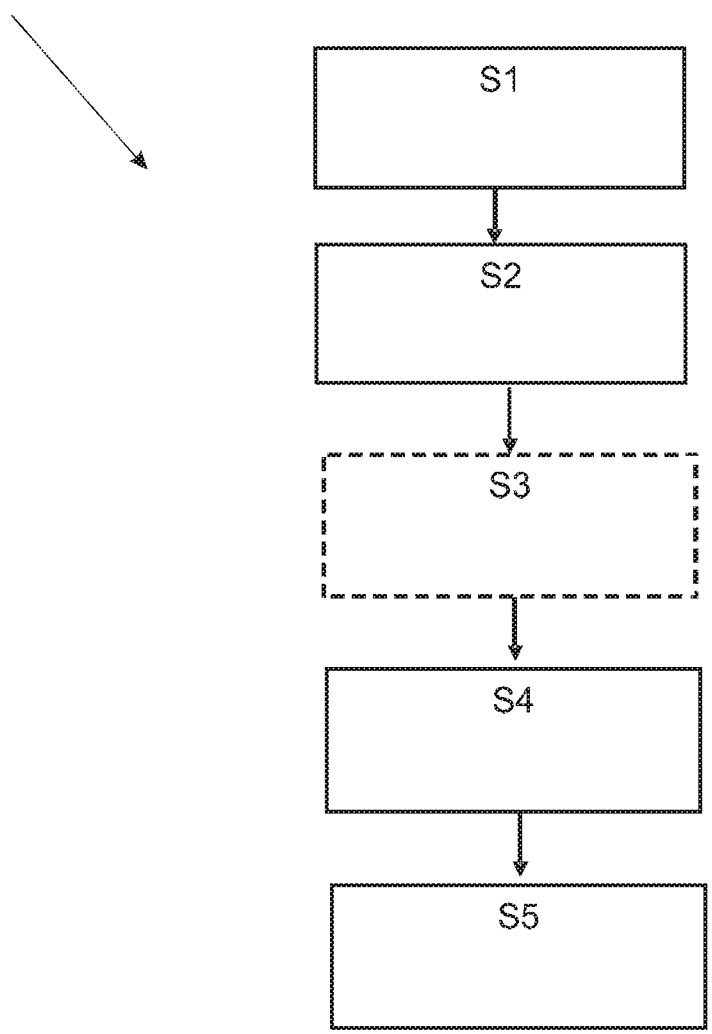
FIG. 5 shows a flow-chart illustrating a method of manufacturing a composite laminate structure of a wind turbine blade part according to this disclosure.

FIG. 5 shows a flow-chart illustrating a method 500 of manufacturing a composite laminate structure of a wind turbine blade part according to this disclosure. The wind turbine blade part is manufactured by means of resin transfer moulding, preferably vacuum-assisted resin transfer moulding, where fibre-reinforcement material is impregnated with liquid resin in a mould cavity. The mould cavity comprises rigid mould part having a mould surface defining a surface of the wind turbine blade part. The method 500 comprises alternately stacking S1 on the rigid mould part:

i. a number of fibre-reinforcement layers comprising electrically conductive fibres, such as carbon fibres, and ii. a flow-enhancing fabric layer for enhancing a flow of the resin during infusion of the fibre-reinforcement layers, the flow-enhancing fabric layer comprising an open-structured layer made of a first material, wherein the flow-enhancing fabric layer comprises a longitudinal direction and a transverse direction.

Each fibre-reinforcement layer may comprise unidirectional fibres. The flow-enhancing fabric layer further comprises filaments or bundles of fibres made of a second material, which is an electrically conductive material and which are arranged and configured to provide a conductive path from first electrically conductive fibres of a first fibre-reinforcement layer on a first side of the flow-enhancing fabric layer to second electrically conductive fibres of a second fibre-reinforcement layer on a second side of the flow-enhancing fabric layer. The filaments or bundles are disposed in an angle defined with respect to the transverse direction.

The method 500 comprises sealing S2 a second mould part, advantageously a flexible mould part, such as a vacuum bag, against the rigid mould part in order to form the mould cavity. The method 500 may optionally comprise evacuating S3 the mould cavity. The method 500 comprises supplying S4 a resin to the mould cavity. The method 500 comprises curing S5 or hardening the resin in order to form the composite laminate structure.

The invention has been described with reference to a preferred embodiment. However, the scope of the invention is not limited to the illustrated embodiment, and alterations and modifications can be carried out without deviating from the scope of the invention.

The invention claimed is:

1. A method of manufacturing a composite laminate structure of a wind turbine blade part by means of resin transfer moulding, where fibre-reinforcement material is impregnated with liquid resin in a mould cavity, wherein the mould cavity comprises a rigid mould part having a mould surface defining a surface of the wind turbine blade part, the method comprising the following steps:
  a. alternately stacking on the rigid mould part:
    i. a number of unidirectional fibre-reinforcement layers comprising electrically conductive fibres, wherein the electrically conductive fibers comprise carbon fibres, and
    ii. a flow-enhancing fabric layer for enhancing a flow of the liquid resin during infusion of the fibre-reinforcement layers, the flow-enhancing fabric layer comprising an open-structured layer made of a first material, wherein the flow-enhancing fabric layer defines comprises a longitudinal direction and a transverse direction, and wherein the first material comprises an electrically non-conductive material,
  b. sealing a second mould part against the rigid mould part in order to form the mould cavity,
  c. optionally evacuating the mould cavity,
  d. supplying the liquid resin to the mould cavity, and
  e. curing or hardening the resin in order to form the composite laminate structure,
  wherein the flow-enhancing fabric layer further comprises filaments or bundles of fibres made of a second material, which is an electrically conductive material, and which are arranged and configured to provide a conductive path from first electrically conductive fibres of a first fibre-reinforcement layer on a first side of the flow-enhancing fabric layer to second electrically conductive fibres of a second fibre-reinforcement layer on a second side of the flow-enhancing fabric layer, and
  wherein the filaments or bundles of fibres made of the second material are disposed at an angle ranging between 15 degrees and 75 degrees with respect to the transverse direction.

2. The method according to claim 1, wherein the second material comprises a material having a resistivity property between $1.5 \times 10^{-8}$ to $5 \times 10^{-6}$ Ohm·meter.

3. The method according to claim 1, wherein the first material is selected from the group consisting of glass fibres and a polymer material.

4. The method according to claim 1, wherein the open-structured layer is a meshed or woven layer.

5. The method according to claim 4, wherein the open-structured layer comprises a bi-axial mesh.

6. The method according to claim 1, wherein the open-structured layer is a perforated layer.

7. The method according to claim 1, wherein the filaments or bundles of fibres made of the second material are woven into the open-structured layer.

8. The method according to claim 1, wherein the filaments or bundles of fibres made of the second material are disposed at an angle between 35 degrees and 40 degrees with respect to the transverse direction.

9. The method according to claim 1, wherein the composite laminate structure is a load-carrying structure of the wind turbine blade, and wherein the flow enhancing fabric layer is arranged to enhance flow in a desired flow direction corresponding to the longitudinal direction, the transverse direction and/or the angled direction, wherein the fibres of the fiber-reinforcement layer are aligned substantially in a longitudinal direction of the load carrying structure.

10. The method according to claim 9, wherein the load-carrying structure is a spar cap integrated in a shell of the wind turbine blade.

11. The method according to claim 1, wherein the fibre-reinforcement material is a hybrid material comprising glass fibres and carbon fibres.

12. The method according to claim 1, wherein the number of fibre-reinforcement layers of step a.i. is between 3 and 10.

13. The method according to claim 1, wherein the resin transfer moulding comprises vacuum-assisted resin transfer moulding.

14. A flow-enhancing fabric layer for enhancing a flow of resin during infusion of fibre-reinforcement layers, the flow-enhancing fabric layer comprising an open-structured layer made of a first material, wherein the flow-enhancing fabric layer defines a longitudinal direction and a transverse direction, and the first material comprises an electrically non-conductive material, wherein the flow-enhancing fabric layer further comprises filaments or bundles of fibres made of a second material, which is an electrically conductive material, and which are arranged and configured to provide a conductive path from first electrically conductive fibres of a first fibre-reinforcement layer on a first side of the flow-enhancing fabric layer to second electrically conductive fibres of a second fibre-reinforcement layer on a second side of the flow-enhancing fabric layer, and wherein the filaments or bundles of fibres made of the second material are disposed at an angle ranging between 15 degrees and 75 degrees with respect to the transverse direction, wherein each of the first and second electrically conductive fibres comprise carbon fibres.

15. A wind turbine blade part comprising a composite laminate structure, wherein the composite laminate structure comprises alternately stacked layers of:
  i. a number of unidirectional fibre-reinforcement layers comprising electrically conductive fibres, wherein the electrically conductive fibers comprise carbon fibres, and
  ii. a flow-enhancing fabric layer for enhancing a flow of a resin during infusion of the fibre-reinforcement layers, the flow-enhancing fabric layer comprising an open-structured layer made of a first material, wherein the flow-enhancing fabric layer defines a longitudinal direction and a transverse direction, wherein the first material comprises an electrically non-conductive material, wherein the alternately stacked layers are embedded in a polymer matrix material, and
  wherein the flow-enhancing fabric layer further comprises filaments or bundles of fibres made of a second material, which is an electrically conductive material, and which are arranged and configured to provide a conductive path from first electrically conductive fibres of a first fibre-reinforcement layer on a first side of the flow-enhancing layer to second electrically conductive fibres of a second fibre-reinforcement layer on a second side of the flow-enhancing layer, wherein the filaments or bundles of fibres made of the second material are disposed at an angle ranging between 15 degrees and 75 degrees with respect to the transverse direction.

16. A wind turbine blade comprising a wind turbine blade part according to claim 15.

* * * * *